United States Patent [19]
Mahn
[11] 4,390,387
[45] * Jun. 28, 1983

[54] FLOCKED MATERIAL HAVING FIRST THERMOSETTING ADHESIVE LAYER AND SECOND THERMOPLASTIC ADHESIVE LAYER

[76] Inventor: John E. Mahn, 6154 Oakhaven, Cincinnati, Ohio 45238

[ * ] Notice: The portion of the term of this patent subsequent to May 26, 1998, has been disclaimed.

[21] Appl. No.: 274,146

[22] Filed: Jun. 16, 1981

[51] Int. Cl.[3] .............................................. B32B 33/00
[52] U.S. Cl. ...................................... 428/90; 156/285; 156/273.1; 428/97; 428/214; 428/215; 428/216
[58] Field of Search ................... 428/90, 97, 214, 215, 428/216; 156/72, 285, 272; 427/200, 206

[56] References Cited

U.S. PATENT DOCUMENTS 4,267,219 5/1981 Ueno .................................... 428/90
4,269,885 5/1981 Mahn ................................. 428/216

*Primary Examiner*—Marion McCamish
*Attorney, Agent, or Firm*—Kinney & Schenk

[57] ABSTRACT

A flocked material is formed of a first layer of a thermoset acrylic copolymer cross-linking water base adhesive having polyester or rayon flock fibers extending from one surface and a second layer of an amorphous thermoplastic polymer adhesive bonded to the other surface. The polymer adhesive is a homogeneous mixture of polyester and polyurethane or of polyamide and polyurethane. When the flocked material is applied to a material with sufficient pressure and heated sufficiently that the layer of polymer adhesive becomes adhesive, the flocked material adheres to the material against which the layer of polymer adhesive is pressed. Thus, the flocked material has particular utility as a letter, numeral, design, or silk screen print product for a sport uniform or wearing apparel, for example, of any material.

11 Claims, 2 Drawing Figures

FLOCKED MATERIAL HAVING FIRST THERMOSETTING ADHESIVE LAYER AND SECOND THERMOPLASTIC ADHESIVE LAYER

When applying letters or numerals, for example, to a sport uniform such as a basketball or baseball uniform, for example, the letters and/or numerals have previously been applied by sewing or by mechanically bonding the letter or numeral to the fabric through having the letter or numeral encapsulate or wrap around the fibers of the fabric of the uniform. Sport uniforms also have had letters or numerals applied by silk screening, but this has not produced the more desired raised letter or numeral that is obtained when sewing or mechanically bonding a letter or numeral to the sport uniform.

One type of lettering material for application to a sport uniform has utilized flock fibers secured to a layer of polyvinylchloride, which is a thermoplastic. When the layer of polyvinylchloride is applied for adhering to the fabric of a uniform by heat and pressure, the pressure exerted on the flock fibers has resulted in crushing of the flock fibers into the polyvinylchloride layer because the polyvinylchloride layer has been heated sufficiently to soften.

This adhering of the layer of polyvinylchloride to the material of the sport uniform is a mechanical bonding. This is due to the polyvinylchloride layer sinking into the material of the sport uniform and encapsulating the fabric.

Another problem with the prior lettering material having flock fibers adhere to a layer of polyvinylchloride is that the polyvinylchloride is not compatible with all materials. For example, it cannot be applied to nylon because vinyl is an incompatible adhesive with nylon.

The flocked material of the present invention overcomes the disadvantages of the prior flocked material in that no mechanical bonding is required. Furthermore, the flocked material of the present invention can be applied to any material including stretch fabrics such as vinyl and nylon, for example.

In comparison with previously available lettering materials for sport uniforms including the material having the flock fibers adhering to the layer of polyvinylchloride, the time period for applying the flocked material of the present invention is significantly reduced. Thus, the normal range for application of the flocked material of the present invention as a letter or numeral on a sport uniform is from five to eight seconds whereas previous application time was about eighteen seconds. Additionally, special heat seal equipment or radio frequency equipment may be employed to enable the flocked material of the present invention to be applied in one second or less. This results in a significant labor cost reduction when lettering a plurality of uniforms.

The flocked material of the present invention is capable of having various designs applied thereto by a silk screen process. Accordingly, a design can be silk screened to the flocked material, which is then applied to the material to which it is to adhere in the same manner. This was not possible with the previously available flocked material of flock fibers secured to the layer of polyvinylchloride.

The flocked material of the present invention may be die cut for use as a sport letter. Because of its strength, the flocked material of the present invention may be cut without the necessity of any backing paper. The previously available flocked material of the flock fibers secured to the layer of polyvinylchloride required the use of a backing paper to die cut a letter. Thus, this prior flocked material required the backing paper to be removed before application of the letter to the material to which it was to adhere, and this increased the time and cost.

When applying letters or numerals formed of the flocked material of the present invention to a sport uniform, there is a built-in quality control. That is, about one half of a single letter or numeral is initially applied to the fabric of the sport uniform and then an attempt is made to peel the adhered letter or numeral from the fabric. If the letter or numeral peels off the garment before breaking, then it has not been applied properly. Additionally, the letter or numeral, which is formed of the flocked material of the present invention, should stretch to approximately three times its original size and return to its original size when released without any disfigurement. This type of quality control test is not available from the prior available materials because they encapsulate or wrap around the fibers of the uniform material so that they cannot be peeled without damaging the uniform material.

When desired, the flocked material of the present invention is easily removed from the fabric to which it is attached without damaging either the fabric or the flocked material so that both the fabric and the flocked material can be used again. This is accomplished through utilizing methylenechloride. While methylenechloride can be employed to remove polyvinylchloride material from another fabric such as that of the lettering material of the prior flocked material having the flock fibers adhering to the layer of polyvinylchloride, it removes the polyvinylchloride by dissolving it. Thus, a letter, which is formed from the previously available flocked material having flock fibers adhering to the layer of polyvinylchloride, cannot be reused while the letter formed from the flocked material of the present invention can be reused.

Additionally, removal of the layer of polyvinylchloride will permanently discolor the material to which it is adhering. The flocked material of the present invention can be removed without any discoloring of the material to which it is adhering.

The flocked material of the present invention is formed of a layer of an amorphous thermoplastic polymer adhesive and a layer of an amorphous thermoset adhesive, which is preferably a thermoset acrylic copolymer cross-linking water base adhesive, bonded to each other with flock fibers adhering to the layer of amorphous thermoset adhesive. The amorphous thermoplastic polymer adhesive is preferably formed of a homogeneous mixture of polyester and polyurethane.

The layer of amorphous thermoplastic polymer adhesive is preferably extruded and is clear except when empolyed with flock fibers of light colors. When the flock fibers are white, pink, or gold, for example, the amorphous thermoplastic polymer adhesive is tinted, preferably white, to prevent strikethrough, which is the undesirable property of the material having the flocked material adhering thereto being detected through the flocked material.

The amorphous thermoset adhesive is a liquid layer on the layer of amorphous thermoplastic polymer adhesive at the time of bonding the two layers to each other at a selected temperature. This selected temperature is sufficient to cause the liquid to become a thermoset adhesive and to have the flock fibers, which have been deposited in the liquid, permanently adhere thereto.

The flocked material will not curl after extended periods of shelf time because the layer of thermoplastic polymer adhesive does not expand or contract at normal room temperatures and the layer of the thermoset adhesive is not subject to expansion and contraction since it is thermoset. Therefore, without any expansion or contraction of the bonded layers, the flocked material of the present invention cannot curl under normal storage conditions.

Because the amorphous thermoset adhesive is thermoset after bonding of the two adhesive layers of the flocked material of the present invention to each other, it remains intact when the flocked material of the present invention is subjected to a sufficiently high temperature and applied to a material with pressure to soften the amorphous thermoplastic polymer adhesive sufficiently to cause it to adhere to the material. As a result of the amorphous thermoset adhesive remaining intact, the flock fibers remain implanted in the thermoset adhesive.

When bonding the layer of amorphous polymer adhesive to the layer of amorphous thermoset adhesive, the resulting flocked material is stronger than either of the original layers. Thus, a stronger material is produced by the present invention. This enables the flocked material to be cut without paper backing as previously mentioned.

When the layer of thermoplastic polymer adhesive is formed of a mixture of polyurethane and polyester, polyurethane pellets can be homogeneously mixed with the polyester pellets prior to extrusion of the layer. By weight, polyurethane would comprise five percent to fifteen percent of the mixture with polyester.

When the flocked material of the present invention is applied to a sport uniform, for example, the layer of thermoplastic polymer adhesive starts to soften at about 225° F. By subjecting the flocked material of the present invention to a temperature of approximately 300° to 400° F. for four to eight seconds at three to eight p.s.i. platen pressure, the layer of thermoplastic polymer adhesive becomes viscous enough that the flocked material of the present invention can be applied to a sport uniform. These conditions produce an adhesive between the layer of polymer adhesive and the sport uniform, which is a fabric substrate.

The flocked material of the present invention may have printing thereon. This printing can be fused to the flocked material when the flocked material is mounted on a fabric substrate to which it is difficult for most materials to adhere such as stretch materials including nylon and vinyl, for example. Therefore, the flocked material of the present invention is not limited to utilization as a letter or numeral on a sport uniform. For example, the flocked material of the present invention can be formed to have printed information thereon rather than being in the shape of a letter or a numeral.

An object of this invention is to provide a unique flocked material.

Another object of this invention is to provide a method for forming a unique flocked material.

A further object of this invention is to provide a flocked material for application to another material through merely applying heat and pressure to the flocked material.

Still another object of this invention is to provide a method for forming a flocked material for application to another material through merely applying heat and pressure to the flocked material.

Other objects, uses, and advantages of this invention are apparent upon a reading of this description, which proceeds with reference to the drawing forming part thereof and wherein.

Figure 1:
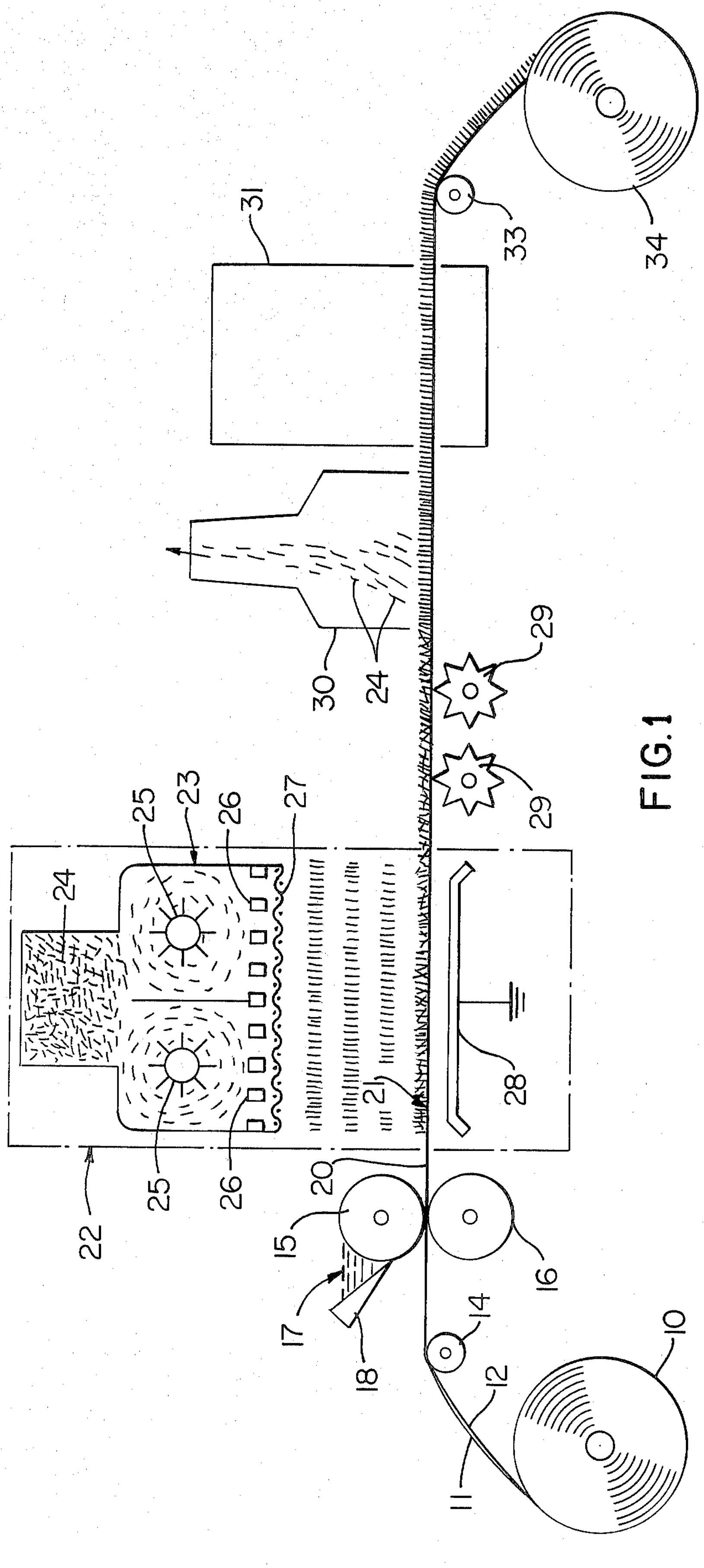
FIG. 1 is a schematic view of an apparatus utilized in forming the flocked material of the present invention.

Referring to the drawing and particularly FIG. 1, there is shown a feeder spool 10 having a layer 11 of a mixture of polyester and polyurethane on a release sheet 12. The layer 11 may be formed of any other suitable amorphous thermoplastic polymer adhesive. One other suitable example of the layer 11 is a mixture of polyamide and polyurethane in the same weight ratio as the mixture of polyester and polyurethane.

The mixture of polyester and polyurethane may have polyurethane comprise five percent to fifteen percent by weight of the total mixture of polyester and polyurethane. This mixture and formation of the layer 11 may be in the manner more particularly described in U.S. Pat. No. 4,269,855 issued to me. After the mixture of polyester and polyurethane is extruded as the layer 11 onto the release sheet 12, the product is rolled and calendered prior to being wound around the feeder spool 10.

The release sheet 12 can be a foil release paper or a silicone release paper, for example. The release sheet 12 is slightly wider than the layer 11 of amorphous thermoplastic polymer adhesive. For example, the release sheet 12 has a width of thirty inches to sixty inches while the layer 11 has a width of twenty-eight inches to fifty-six inches. It should be understood that the release sheet 12 is removed and can be reused if desired.

The feeder spool 10 supplies the layer 11 of the mixture of polyester and polyurethane and the release sheet 12 over a support or dancer roll 14 to a pair of feed rollers 15 and 16. The rollers 15 and 16 are driven at the same rate by any suitable drive means such as a motor (not shown) and gearing (not shown), for example. The rollers 15 and 16 are driven at the same rate as the dancer roll 14.

Figure 2:
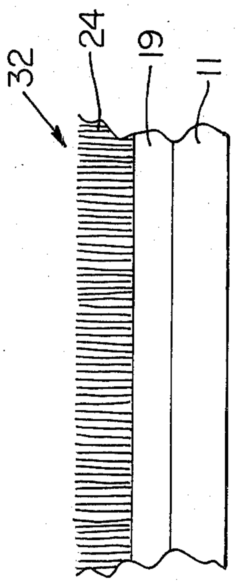
FIG. 2 is a side elevational view showing the relationship of the materials forming the flocked material of the present invention.

An amorphous liquid adhesive 17, which is preferably an acrylic copolymer cross-linking water base adhesive capable of being thermoset, is applied with a doctor blade 18 to the upper surface of the layer 11 of the amorphous thermoplastic polymer adhesive adjacent the feed roller 15. The doctor blade 18 is positioned relative to the feed roller 15 so that the thickness of a layer 19 (see FIG. 2) of the cured adhesive from the liquid adhesive 17 (see FIG. 1) will have a desired thickness between one and three mils with this thickness preferably being two mils. The thickness of the layer 19 of the cured adhesive will be less than the thickness of the layer 11 of the mixture of polyester and polyurethane with the layer 11 having a thickness in the range of three to five mils.

As an example, the doctor blade 18 must be positioned relative to the feed rollers 15 so that approximately six to eight mils of the liquid adhesive are deposited on the layer 11 of the mixture of polyester and polyurethane in order that the layer 19 (see FIG. 2) of dried or cured liquid adhesive will have a thickness of one mil. The feed roller 15 (see FIG. 1) is coated or covered with a suitable material such as Teflon or silicone, for example, to prevent sticking or tacking of the liquid adhesive 17.

Suitable examples of the amorphous liquid adhesive 17 when it is an acrylic are copolymer cross-linking water base acrylics sold by Rohm & Haas as Rhoplex LE-1126 and Rhoplex K-87. Other suitable examples of a liquid acrylic to be used as the liquid adhesive 17 are copolymer cross-linking water base acrylics sold by Union Carbide as No. 872 and No. 878.

The support or dancer roll 14 prevents streaks in the liquid adhesive 17 applied to the top surface of the layer 11 of the mixture of polyester and polyurethane through preventing flutter of the layer 11 of the mixture of polyester and polyurethane. These streaks are due to the feeder spool 10 feeding erratically because of slight differences in the thickness across the layer 11 of the mixture of polyester and polyurethane. These streaks would result in the absence of the liquid adhesive 17 at various spots on the layer 11 of polyester and polyurethane.

The layer 11 of the mixture of polyester and polyurethane with layer 20 of liquid adhesive thereon and the release sheet 12 therebeneath may be deemed to be a film 21, which is directed into a flock unit 22. One suitable example of the flock unit 22 is sold by Spellman High Voltage, Long Island, N.Y.

The flock unit 22 includes a hopper 23 having flock fibers 24 therein. The flock fibers 24, which may have any desired color, are finely chopped fibers having lengths between one and three mils. The flock fibers 24 may be formed of any suitable material such as rayon, polyester, nylon, or cotton, for example. The flock fibers 24 are preferably rayon and polyester. Suitable sources of the rayon or polyester flock fibers 24 are Clairemont Flock, Clairemont, New Hampshire and Vertipile Corporation, Worchester, Mass.

The hopper 23 includes a pair of flock stirrers 25, which are rotating elements with a plurality of arms. The flock stirrers 25 prevent the flock fibers 24 from collecting so that they are moved about randomly within the hopper 23.

The flock hopper 23 has a plurality of positive electrodes 26, which are rectangular shaped bars, extending longitudinally across its bottom above a screen 27. Thus, the flock fibers 24 are given a positive charge prior to sifting through the screen 27 to exit from the hopper 23.

The flock unit 22 also includes a grounded negative electrode 28, which is a plate. The electrode 28 is disposed beneath the bottom of the film 21. Thus, the positive charged flock fibers 24 are attracted towards the negative electrode 28 and embedded into the layer 20 of the liquid adhesive because of the presence of the negative electrode 28.

If one of the flock fibers 24 already is in the layer 20 of the liquid adhesive at the position at which one of the flock fibers 24 falls, then the flock fiber 24 will be repelled and given a reverse charge to return towards the positive electrodes 26 from which it came. Then, the flock fiber 24 again becomes positively charged by the positive electrodes 26 and is attracted to the layer 20 of liquid adhesive again. This process continues until the layer 20 of liquid adhesive is completely covered with the flock fibers 24.

The rate of the flock fibers 24 falling toward the layer 20 of liquid adhesive is controlled by adjusting the magnitude of the charge between the electrodes 26 and 28 so that the layer 20 of liquid adhesive is completely covered with the flock fibers 24 during travel through the flock unit 20. This rate of the flock fibers 24 is determined by the speed of movement of the film 21.

After leaving the flock unit 22, beater bars 29 act against the bottom surface of the release sheet 12. The beater bars 29 are circular shaped bars with indentations spinning at a relatively high speed to spank the underside of the release sheet 12 to vibrate the layer 11 of the mixture of polyester and polyurethane and the layer 20 of liquid adhesive with the flock fibers 24 therein. This vibration causes the flock fibers 24 to work themselves into the layer 20 of liquid adhesive to be retained therein.

After the film 21 is subjected to the beater bars 29, a suction apparatus 30 applies a suction to the surface of the layer 20 of liquid adhesive having the flock fibers 24 embedded therein. The suction apparatus 30 sucks up and removes any of the flock fibers 24 which have not adhered to the layer 20 of liquid adhesive.

After being subjected to the suction apparatus 30, the film 21 enters an oven 31 in which curing occurs. The oven 31 is preferably set in a temperature range of 250° to 300° F. at which the layer 11 of the mixture of polyester and polyurethane softens but does not become viscous with the film 21 remaining in the oven 30 for a time period between one and three minutes.

The speed of movement of the film 21 is selected in accordance with the temperature at which the oven 31 is maintained and its size so that the travel of the film 21 through the oven 31 provides a sufficient period of time to cause the layer 20 of liquid adhesive of the film 21 to thermoset to become the layer 19 (see FIG. 2) of an amorphous thermoset adhesive with the flock fibers 24 anchored thereto so as to be permanently secured thereto. As an example, the speed of movement of the film 21 (see FIG. 1) can be in the range of thirty-five to forty feet per minute.

The oven 31 may be a conduction oven, a convection oven, or a radiation oven, for example. One suitable example of a conduction oven is a gas oven. One suitable example of a convection oven is an electric radiant heater oven. One suitable example of a radiation oven is a microwave oven.

This curing within the oven 31 also bonds the layer 19 of the amorphous thermoset adhesive to the layer 11 of the mixture of polyester and polyurethane. This produces a flocked material 32 (see FIG. 2) for application of a fabric substrate.

Furthermore, the layer 19 of the amorphous thermoset adhesive becomes a barrier to the embedded flock fibers 24 ever entering the layer 11 of the mixture of polyester and polyurethane at the time when the flocked material 32 is subjected to a temperature and pressure to cause the layer 11 to become viscous so as to be applied to the fabric substrate. It should be understood that the temperature in the oven 31 (see FIG. 1) is not sufficient to cause the layer 11 of the mixture of polyester and polyurethane to become viscous since no pressure is applied at this time as occurs when the flocked material 32 (see FIG. 2) is applied to a fabric substrate.

Next, the flocked material 32 and the release sheet 12 (see FIG. 1) enter a cooling area having a chill roll 33. The chill roll 33, which is driven at the same rate as the feed rollers 15 and 16, is maintained at a selected temperature range such as 35° F. to 45° F., for example, to cool the product. Thus, the flocked material 32 (see FIG. 2) is subjected to cooling for a selected period of time at a selected temperature since the flocked material 32 passes around a portion of the chill roll 33 (see FIG. 1).

After passing around a portion of the chill roll 33, the bonded layers 11 and 19 (see FIG. 2) and the release sheet 12 (see FIG. 1) are wound around a storage spool 34, which is driven at the same rate as the feed rollers 15 and 16. When a sufficient amount of the bonded layers 11 and 19 (see FIG. 2) is wound upon the storage spool 34 (see FIG. 1), it is removed therefrom and allowed to cure for twenty-four to forty-eight hours.

As previously mentioned, the layer 11 may be formed of a mixture of polyamide and polyurethane with the polyurethane being five percent to twenty five percent by weight in this mixture. The polyamide may be formed by roll molding rather than extruding if desired.

It should be understood that the layer 11 is normally clear. However, when the flock fibers 24 and the layer 19 are relatively light colors such as white, pink, or gold, for example, the layer 11 is tinted, preferably white, to prevent strikethrough.

An advantage of this invention is that it has an unlimited shelf life and does not curl or age while in storage. Another advantage of this invention is that the flocked material can be washed or dry cleaned. A further advantage of this invention is that is can be removed without damaging the material to which it is attached. Still another advantage of this invention is that it may be applied under a wide range of pressure conditions whereby any machine including a hand iron can be utilized. A still further advantage of this invention is that a wide range of temperatures may be employed to apply the flocked material to a sport uniform, for example, so that it can be applied to any type of material. Yet another advantage of this invention is that the flocked material feels soft to the hand but is durable to wash and wear. A yet further advantage of this invention is that the flocked material can be die cut upon itself to form letters or numerals, for example, without the necessity of backing paper. Yet still another advantage of this invention is that designs or information can be silk screen printed on the flocked material. A yet still further advantage of this invention is that it can withstand numerous washings and dry cleanings. Still another advantage of this invention is that it will stretch with the material to which it is applied while returning to its original shape upon release without breaking or cracking.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A combination comprising a flocked laminate of two layers including a first layer of amorphous thermoset adhesive having flock fibers permanently adhering to one surface thereof and the opposing surface of said first layer being bonded to a second layer containing an amorphous thermoplastic adhesive selected from the group consisting of a mixture of polyester and polyurethane and a mixture of polyamide and polyurethane wherein said second layer has a thickness greater than the thickness of said first layer, and said second layer becoming adhesive upon heating, said laminate being non-curling.

2. The combination of claim 1 wherein said amorphous thermoplastic adhesive is a mixture of polyester and polyurethane with polyurethane comprising from about 5 to 15 percent by weight of said mixture.

3. The combination of claim 1 wherein said amorphous thermoplastic adhesive is a mixture of polyamide and polyurethane with polyurethane comprising from about 5 and 25 percent by weight of said mixture.

4. The combination of claim 1, 2, or 3 wherein said first layer contains a thermoset acrylic polymer crosslinking water base adhesive.

5. The combination of claim 1 wherein said first layer has a thickness no greater than 3 mils.

6. The combination of claim 5 wherein said second layer has a thickness no greater than 5 mils.

7. The combination of claim 1 wherein said flocked laminate is in the form of a letter or number.

8. The combination of claim 1 wherein said second layer of said flocked laminate is directly adhered to a fabric.

9. The combination of claim 8 wherein said flocked laminate is in the form of a letter or number.

10. The combination of claim 8 wherein said first layer having flock fibers adhering thereto as printing thereon.

11. A process of forming the combination of claim 8 comprising directly adhering said second layer of said flocked laminate to the fabric with heat and pressure.

* * * * *